United States Patent Office 3,037,052
Patented May 29, 1962

3,037,052
CATALYZING REACTIONS WITH CATION EXCHANGE RESIN
Newman M. Bortnick, Oreland, Pa., assignor to Rohm & Haas Company, Philadelphia, Pa., a corporation of Delaware
No Drawing. Filed Apr. 29, 1959, Ser. No. 809,606
26 Claims. (Cl. 260—485)

This invention concerns the preparation of esters by the reaction of organic acids with olefins. More particularly, it concerns the preparation of esters by the addition to olefins of saturated as well as monoethylenically unsaturated acids. More specifically, it concerns the direct production of esters by reacting olefins, with organic acids at low temperatures in the presence of a particular type of cation exchange resin. This particular type of cation exchange resin is a nuclear sulfonic polymer prepared by a new process.

The direct esterification of olefins, with organic acids can be resolved into two major problems: (1) the esterification reaction of the olefin with the acid; and (2) separating the resulting organic ester from the catalyst and/or the rest of the reaction mixture. When the usual type acidic catalyst, such as sulfuric acid or benzenesulfonic acid, is used, for instance, in the esterification of isobutylene with acetic acid, the sulfuric acid catalyst may be washed out of the organic reaction products with water. It is uneconomical to recover the sulfuric acid by concentration. It is likewise uneconomical to discard the sulfuric acid since it contains acetic acid. While the sulfuric acid can be separated from the acetic, acetic acid is then so dilute that it is uneonomical to conentrate it. These difficulties are discussed in some detail in Ind. Eng. Chem. 30, 55–8 (1938), and a number of attempts have been made to overcome these difficulties. None of the suggestions for removing the ester from the soluble acidic catalysts are satisfactory.

This invention is for a novel process of preparing organic esters by the direct esterification of olefins. It has been discovered that a number of marked advantages are obtained when, in esterification reactions employing olefins and organic acids, an acid ion exchange resin is used rather than the conventional soluble strong acid catalysts. The advantages which are obtained by the application of this new process include the ease of reaction, the convenience with which the catalyst can be removed from the reaction products, the lack of color bodies produced in the ester products by the presence of the resin catalyst, the economical features of recycling the recovered solid resin catalyst for re-use in further esterification, and the lack of corrosion of metal equipment. Furthermore, since the acid ion exchange resin can be readily separated from the unconverted acetic acid without dilution of said acid, the acid can be recycled without any additional treatment. This ion exchange resin process, particularly in the case of the tertiary alkyl esters, has the added advantage of permitting complete removal of strong acids from the esters prior to purification of the esters by conventional methods, such as distillation. These tertiary alkyl esters are unstable in the presence of even traces of strong acid, particularly at elevated temperatures. If a homogeneous catalyst, such as sulfuric acid, is used, it is practically impossible to remove all traces of strong acid without neutralization, and the tertiary alkyl ester generally undergoes extensive decomposition on distillation. With sulfuric acid as catalyst, the unreacted aliphatic acid cannot be recycled without intermediate purification, and, therefore, high yields cannot be obtained.

The use of cation exchange resins as catalysts for the reaction of olefins and aliphatic acids is set forth in the prior art. While their use as a replacement for other catalysts, such as sulfuric acid, does offer advantages such as ease of removal of catalyst from the product, etc., they do have serious shortcomings. Their catalytic activity is lower than many of the commonly used homogeneous catalysts and they frequently require prolonged reaction times at elevated temperatures. This is particularly disadvantageous in the preparation of tertiary alkyl esters where the reaction between the olefin and the acid to form the corresponding esters tends to reverse at elevated temperatures. As shown in the prior art, the yields of esters vary from 17% to 40% when employing aliphatic monocarboxylic acids with the prior art cation exchange resins as catalysts.

It is also true that some of the reactions which are catalyzed by homogeneous acidic catalysts are not catalyzed by the sulfonic type cation exchangers of the prior art.

It has been surprisingly found that the reaction of olefins with carboxylic acids in the presence of a cation exchange resin catalyst containing sulfonic acid groups can be effected at low temperatures to produce high yields of esters if the cation exchange resins used as catalysts are prepared by a process which results in cation exchange resins containing sulfonic acid groups which possess a macro-reticular structure.

The term "macro-recticular" structure as used hereinafter in the specification, examples, and in the claims refers to a unique porous structure. It has been found that this structure is developed when monoethylenically unsaturated monomers are copolymerized with polyvinylidene monomers in the presence of certain compounds. Characteristic of these compounds is the fact that each is a solvent for the monomer mixture being copolymerized and exerts essentially no solvent action on said copolymer. For ease of reference hereinafter, such a compound will be termed "precipitant."

The ion exchange resins containing sulfonic acid groups prepared using said copolymers as intermediates also exhibit unusual and unexpected properties.

It is necessary that precipitants form a homogeneous solution with the monomer. Further requirements are that the precipitants must be incapable of exerting solvent action on or being imbibed by the copolymer to any appreciable extent or the aforesaid unique properties will not be obtained in the copolymers produced. An additional requirement is that the precipitants must be chemically inert under the polymerization conditions, that is to say they must not react chemically with any of the reactants or the suspending medium if one be used. A preferred class of precipitants are those which are liquid under the poymerization conditions.

The determination of the most effective precipitant and the amounts required for the formation of a particular copolymer with macro-reticular structure may vary from case to case because of the numerous factors involved. However, although there is no "universal" or single class of precipitants applicable to all cases, it is not too difficult to determine which precipitants will be effective in a given situation. The requirmements of solubility with the monomer mixture and low or non-solubility in the copolymer can be tested empirically and the solubilities of many monomers and copolymers are well-known from publications and textbooks.

Cross-linked copolymers are generally insoluble, but they will absorb or imbibe liquids which might be considered as being good "solvents." By immersing the cross-linked copolymer in liquids and determining the degree of swelling, a suitable precipitant can be chosen. Any liquids which are solvents for the monomer mixture, which give negligible swelling of the copolymer, which are chemically inert under polymerization conditions, and which are substantially insoluble in the suspending medium, if one be used, will function as precipitants.

As a further guide in the selection of a suitable precipitant, reference may be made to scientific literature, for instance as discussed in Hildebrand and Scott, Solubility of Non-Electrolytes, 3d Ed., New York, 1950. In general, it may be stated that sufficiently wide differences in the solubility parameters of polymer and solvent, respectively, must exist for the precipitant to be effective; and that, once an effective precipitant has been located, the behavior of many other liquids may be predicted from the relative position of the reference polymer and precipitant in published tables, within the accuracy of such published information. Furthermore, if the solubility parameter of a given polymer occupies an intermediate position in these tables, solvents with both higher or lower parameters may become effective.

A minimum concentration of any particular precipitant is required to effect phase separation. This is comparable to the observation that many liquid systems containing two or more components are homogeneous when some components are present in only minor amounts; but if the critical concentration is exceeded, separation into more than one liquid phase will occur. The minimum concentration of the precipitant in the polymerizing mixture will have to be in excess of the critical concentration. The amounts in excess of such critical concentration can be varied and they will influence to some extent the properties of the product so formed.

Too high a concentration of the precipitant may be undesirable for practical reasons since the rate of copolymerization may decrease and the space-time yields become low. In many cases, the amount of precipitant employed may be between 30% and 60% of the total weight of the monomer mixture and the precipitant.

Introduction of the precipitant leads to two effects, the second effect undoubtedly depending on the first. By adding the precipitant to the monomer phase, the solubility in the monomer phase of any copolymer formed is decreased and the copolymer separates from the monomer phase as it is formed. This phenomenon is known as "phase separation." As the concentration of monomer in the polymerizing mass decreases due to polymerization, and as the concentration of resulting copolymer increases, the precipitant is more strongly repelled by the copolymer mass and is actually squeezed out of the copolymer phase leaving a series of microscopic channels.

These microscopic channels are separate and distinct from the micropores which are present in all cross-linked copolymers as is well-known to those skilled in the art (cf. Kunin, "Ion Exchange Resins," page 45 et seq., John Wiley & Sons, Inc., 1958). While said channels are relatively small in the commonly thought of sense, they are large when compared with the micropores hereinbefore referred to. Thus, as set forth hereinafter, the use of a precipitant results in the formation of an unusual and desirable macro-reticular structure. It is postulated that this "liquid expulsion" phenomenon and the resulting macro-reticular structure is responsible for the unusual and unexpected properties of the resultant copolymer. Since the rigidity of the polymer mass at the time of precipitant expulsion is important, it is not surprising that the desirable properties obtained increase with increasing polyvinylidene content, i.e. increasing degrees of cross-linking. As a specific example, using a sulfonated styrene-divinylbenzene copolymer, the process of the present invention is appreciably less effective below about 4% to 6% divinylbenzene content in the copolymer than it is at higher divinylbenzene levels. With this specific system, a range of divinylbenzene content from about 6% to about 55% will give the desired effect, and preferred effects are obtained with a divinylbenzene content of from about 10% to about 25%, based on the weight of the monomer mixture.

Precipitants suitable for the styrene-divinylbenzene copolymers which are preferred as intermediates for the sulfonic acid cation exchange resin catalysts of the present invention include alkanols with a carbon content of from 4 to 10, such as n-butanol, sec-butanol, tert-amyl alcohol, n-hexanol, and decanol. Higher saturated aliphatic hydrocarbons, such as heptane, iso-octane, and the like can also function as precipitants in these systems.

For use as the catalyst in the process of the present invention, the preferred cation exchange resin is the nuclear sulfonic acid type. These resins can be prepared, for example, by sulfonating a copolymer of styrene and a polyvinylidene monomer, such as divinylbenzene, trivinylbenzene, as well as polyvinyl ethers of polyhydric alcohols, such as divinoxyethane and trivinoxypropane which have been prepared by the process set forth hereinbefore. The sulfonating agent may be concentrated sulfuric acid, oleum, sulfur trioxide or chlorosulfonic acid. A typical preparation is as follows:

A mixture of styrene (121.6 grams) technical divinylbenzene (38.4 grams containing 50% active ingredient), 87 grams of tertiary amyl alcohol and 1 gram of benzoyl peroxide was charged to a solution of 6.5 grams of sodium chloride and 0.5 gram of the ammonium salt of a commercial styrene-maleic anhydride copolymer in 174 grams of water. The mixture was agitated until the organic components were dispersed as fine droplets and then heated to 86° to 88° C. for six hours.

The resultant polymer pearls were filtered and washed with water and freed from excess water and amyl alcohol by drying at elevated temperature. The product was obtained in the form of white opaque spherical or spheroidal particles amounting to 145 grams. When the dried product was dropped into a fluid such as hexane, fine bubbles were seen to rise from the immersed particles due to displacement of air held within the void spaces of the resin by the organic fluid.

This copolymer was converted to the sulfonic acid derivative by heating with agitation 75 grams of the copolymer with 750 grams of 99% sulfuric acid at 118° C. to 122° C. for six hours. The mixture was then cooled to about 20° C. and diluted with water. The diluted acid was removed by filtration and the resin washed with deionized water until free of acid.

The deionized water used had a quality of $10^6$ ohm-cm. and the washing was continued until the effluent from the wash had a value of $10^6$ ohm-cm.

As has been set forth hereinbefore, the ratios of styrene to divinylbenzene can be varied widely, and other polyvinylidene cross-linking agents can be employed. The amount of precipitant can also be varied over the range hereinbefore set forth, and other precipitants of the type set forth hereinbefore can be successfully employed.

For use as catalysts in the processes of the present invention, the sulfonic acid cation exchange resins of the type set forth hereinbefore must be dehydrated prior to use. One method of dehydration is drying at elevated temperatures under reduced pressure until a constant weight is obtained. Thus, drying at 105° C. to about 125° C. at a pressure of 5 to 10 mm. will effect dehydration. The resin may also be dehydrated by azeotropic distillation with an organic liquid, such as an aromatic or aliphatic hydrocarbon until no water is obtained in the distillate. Typical hydrocarbons include heptane, iso-octane, toluene, xylene or mixtures thereof. The precise water content of the dehydrated resin produced by either of these dehydration processes is very difficult to determine, but either process will produce catalysts which are eminently satisfactory. The presence of water not only decreases the catalytic activity of the resin but frequently tends to reverse the equilibrium of the reaction. For similar reasons, it is important that the reactants be dried prior to the reaction. Well-known conventional methods of drying the reactants can be employed.

Acid anhydrides may be employed to effect removal of water from the resin and/or the reaction mixture. The amount of anhydride used should be equivalent to the water content of the reaction mixture, including the resin.

In addition to styrene, other monovinyl aromatic hydrocarbons can be used in conjunction with polyvinyl compounds to produce cross-linked copolymers possessing macro-reticular structures by the process hereinbefore set forth. Such monovinyl aromatic hydrocarbons include α-methylstyrene, mono- and polychlorostyrenes, vinyltoluene, vinylanisole, and vinylnaphthalene. The copolymers so formed can be sulfonated as hereinbefore set forth, dehydrated, and employed as catalysts in the processes of the present invention.

The ratio of moles of resin (a "mole" of resin is defined as the weight in grams of dehydrated resin per sulfonic acid group) per mole of mixed reactants, i.e. olefin and acid, will vary widely depending on whether a batch or a continuous process is employed. Thus, in a batch process, the ratios of moles resin to moles reactant mixture may vary from 0.001:1 to 0.25:1. A preferred ratio is from 0.02:1 to 0.10:1. In the continuous process, it is difficult to state the ratios because one charge of resin can be used for prolonged periods to produce large quantities of esters. In any given section of the packed reactor, however, the ratio of the volume of the resin to the volume of the reactant mixture is substantially 1:1, since the resin as used has approximately 50% void volume.

The olefins which will react with carboxylic acids at low temperatures in the presence of the specific cation exchange resin of the present invention are limited in number and are all characterized by having the structure

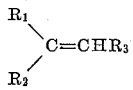

in which $R_1$ and $R_2$ taken singly are selected from the group consisting of methyl and ethyl, and $R_3$ individually is selected from the group consisting of H, $CH_3$, $C_2H_5$, $R_1$ and $R_2$ taken collectively represent a four- to five-membered aliphatic chain and $R_1$ and $R_3$ taken collectively represent a three- to four-membered aliphatic chain, and the total carbon atom content of the olefin is not greater than 8.

It has been noted that the equilibrium constant of the reaction in favor of ester formation

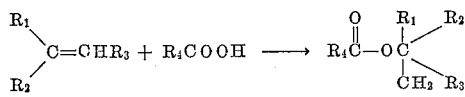

decreases rapidly as the size of the substituents $R_1$, $R_2$ and $R_3$ increase, and the ester formation under the reaction conditions of the present invention is low if the total carbon content of the olefin exceeds 6. Typical examples of the olefins which can be employed include isobutylene, trimethylethylene, 2-methyl-1-butene, 2-methyl-1-pentene, 2-methyl-1-hexene, 2-methyl-1-heptene, 2-ethyl-1-butene, methylenecyclopropane, methylenecyclobutane, methylenecyclopentane, methylenecyclohexane, methylenecycloheptane, 1 - methylcyclohexene, 1,4 - dimethylcyclohexene, and β-pinene.

Saturated or unsaturated carboxylic acids may be used and with the exception of oxalic acid, which is operable, are of the general formula $$R_4(COOH)_Z$$

in which $R_4$ is selected from the group consisting of hydrogen, carboxyl, a hydrocarbon group, and

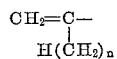

in which $n$ is an integer from 0 to 2 and Z is an integer from 1 to 2; typical examples of the acids include formic, acetic, propionic, butyric, isobutyric, valeric, caprylic, pelargonic, lauric, myristic, palmitic, stearic, pivalic, triethylacetic, dipropylacetic, neopentylacetic, neopentyldimethylacetic, oxalic, malonic, succinic, glutaric, adipic, pimelic, sebacic, acrylic, methacrylic, crotonic, angelic, tiglic, undecylenic, oleic, cyclohexanecarboxylic, pinonic, cyclopropanecarboxylic, benzoic, toluic, mesitylic, durylic, α-naphthoic, β-naphthoic, phenylacetic, p-tolylpropionic, β-naphthylacetic, p-chlorobenzoic, m-methoxyphenylacetic, piperonylic, veratric, phthalic, isophthalic, terephthalic, naphthalic, m-bromobenzoic, homoveratric, cinnamic, dihydrocinnamic, octahydrocinnamic, tetrahydrobenzoic, endomethylenetetrahydrobenzoic, methoxyacetic, ethoxypropionic, butoxybutyric, phenoxyacetic, 2,4-dichlorophenoxyacetic, 2,4,5-trichlorophenoxyacetic, cyanoacetic, chloroacetic, α,α-dichloropropionic, α,β,β-trichloroacrylic, trichlorocrotonic, dichloroacetic, α-bromopropionic, trimesic, fumaric, maleic, itaconic, citraconic, aconitic, muconic, and acetylenedicarboxylic acids.

The ratios of the olefins to the acids can be varied over wide ranges and still be within the scope of the present invention. Since it is postulated that one double bond reacts with one carboxyl group, the ratios of reactants should be expressed as the ratios of double bonds in the olefin to carboxyl groups in the acid. If it is desired to effect as complete reaction of the acid as possible, then an excess of olefin should be used. Ratios of moles double bond to moles carboxylic group as high as 10:1 can be employed. It should be noted, however, that such high excesses of olefin may result in undesirable polymerization of the excess olefin. If it is desired to effect as complete reaction of the olefin as possible, then as high as 10 moles of carboxylic group per mole of double bond may be employed. In general, ratios of moles double bond to moles carboxylic group from about 1.5:1 to 1:1.5 are suitable, with a 1:1 molar ratio constituting the preferred embodiment.

The reaction temperature required for satisfactory conversions will depend on the specific olefins and acids employed. It will also depend to some extent on the reaction time permitted as in the case of batch or continuous processes. A reaction temperature of from about −20° to about 50° C. is satisfactory with the preferred range being from 0° to 20° C. In many cases, the reaction is highly exothermic, and the desired temperature can be maintained only by external cooling.

The reaction time required is a variable value depending on the specific reactants employed and the temperature used, with the temperature having the greatest effect in determining the reaction time. Thus, in the case of continuous processes, a contact time of as little as five seconds will give satisfactory conversion. The upper limit on the reaction time is determined by the relative rates of the esterification reaction and the rates of reaction of unwanted reactions, such as those which cause polymerization of one or both of the reactants, or breakdown or polymerization of the desired products.

As set forth in the examples hereinafter, the process can be conducted as a batch process in which the olefin is slowly added to an agitated mixture of the acid and the sulfonic cation exchange resin in the dehydrated acid form. At the completion of the reaction, the cation exchange resin is removed from the reaction mixture by filtration, centrifugation, etc., the unreacted acid and olefin removed from the ester and recycled to the reaction vessel. If necessary, the ester can be further purified by distillation, but the purities of the esters produced by the process of the present invention are frequently so high that no further purification is necessary.

A continuous process can be employed by passing a mixture of the olefin and the acid through a fixed bed reactor which is packed with the sulfonic cation exchange resin in the dehydrated acid form. The reactor is maintained at the desired temperature by cooling. It is possible to make such a process completely continuous by employing a continuous distillation unit in which the unreacted olefin and acid are removed from the product and continuously recycled with the necessary additions of fresh acid and olefin. The ester is also continuously removed from the distillation unit.

In some cases, due to the very high exotherm, it is not possible to design a practical fixed bed unit which can be maintained at the temperature required. In these cases, it is frequently advantageous to employ a combination stirred reactor and fixed bed process in which the major part of the exotherm is dissipated in the stirred reactor, which can be readily maintained at the required temperature by external and/or internal cooling, completing the reaction in the fixed bed reactor. Other process embodiments will be apparent to those skilled in the art.

Since the reaction is an equilibrium process, the extent of reaction or conversion to the desired ester is a function of the concentration of the reactants. Therefore, it is desired to use the highest possible concentration of reactants, and, as a result of this, solvents are employed only when necessary. Solvents may be required if the acid is a solid and/or insoluble in the olefin. If the acid has only a low degree of solubility in the olefin, excess olefin may be employed as solvent and recycled after separation from the reaction mixture. If the acid does not have sufficient solubility in the olefin, solvents which are chemically inert under the reaction conditions may be employed. Typical solvents include dioxane, halogenated hydrocarbons, such as methylene chloride, chloroform, carbon tetrachloride, and dichloroethane. Aromatic hydrocarbons such as benzene and toluene may also be employed as can diethyl ether and substituted aliphatic ethers.

The pressure employed is not critical, but it is preferred to use a pressure which will maintain the reactants in a liquid condition. Atmospheric pressure is generally satisfactory, but when employing low boiling olefins, such as isobutylene, increased pressure up to five atmospheres may be employed. There is no objection to the use of pressures as high as 1000 atmospheres. However, super-atmospheric pressure is used primarily to maintain the reactants in the liquid phase and only secondarily to increase the rate of the reaction.

The esters prepared by the process of the present invention are, in general, well-known compounds of commerce with well-established uses. Thus, the lower fatty acid esters are of value as solvents for lacquers and for the preparation of solutions of other resins, which solutions can be used as impregnants, adhesives, coatings, etc.

The acrylate, methacrylate and ethacrylate esters are well-known polymerizable monomers which can be polymerized, alone or in admixture with other polymerizable ethylenically unsaturated monomers to produce a variety of plastics. Thus, poly(tert-butyl acrylate) is a very hard polymer and minor amounts can be used in conjunction with softer acrylates to harden the film and thus increase the softening point. These acrylic monomers, either alone or in conjunction with other monoethylenically unsaturated monomers, may be copolymerized with polyvinylidene compounds to give cross-linked copolymers which can be hydrolyzed to carboxylic acid type cation exchangers or subjected to aminolysis to produce anion exchangers as set forth in the prior art.

The catalysts employed in the following examples are prepared as set forth hereinbefore in this application. The catalysts set forth in Table I are styrene-divinylbenzene copolymers prepared in the presence of precipitants. The concentration of cross-linking agent, divinylbenzene, is varied over wide ranges, and the concentration is expressed as percentage of the weight of the total monomer mixture. The amount and nature of the precipitant is also varied and the concentration is expressed as percentage of the weight of the total organic phase, i.e. weight of monomer mixture plus precipitant. In Table I, "TAA" is tert-amyl alcohol, "IO" is iso-octane, and "SB" is sec-butyl alcohol.

TABLE I

| Catalyst | Concentration Divinylbenzene, Percent | Precipitant |
|---|---|---|
| A | 20 | 35% TAA. |
| B | 10.5 | 42% TAA. |
| C | 20.5 | 50% IO. |
| D | 20 | 42% IO. |
| E | 12.5 | 40% IO. |
| F | 6 | 40% SB. |
| G | 20 | 50% IO. |
| H | 55 | 50% SB. |
| I | 50 | 35% TAA. |

As set forth hereinbefore, other monovinyl aromatic hydrocarbons can be substituted for styrene without detracting from the catalytic efficiency of the cation exchange resins so prepared. Typical of such monovinyl aromatic hydrocarbons include α-methylstyrene, mono- and polychlorostyrenes, vinyltoluene, vinylanisole, and vinylnaphthalene.

In addition to divinylbenzene, other cross-linking co-monomers can be employed to produce satisfactory catalysts. Typical cross-linkers include trivinylbenzene, divinylnaphthalene, divinoxyethane and trivinoxypropane.

The following examples set forth certain well-known defined embodiments of the application of this invention. They are not, however, to be considered as limitations thereof, since many modifications may be made without departing from the spirit and scope of this invention.

Unless otherwise specified, all parts are parts by weight. Unless otherwise noted, all temperatures are centigrade.

*Example I*

A mixture of methacrylic acid (86 parts) and Catalyst A (10 parts) are charged to a reactor and allowed to stand at room temperature overnight. The reactor is cooled and isobutylene (56 parts) is added to the stirred mixture as a liquid. During the 10-minute period required for this addition, the reactor and its contents are cooled to $-5°$. Thereafter, the temperature is maintained at $0°-1°$ by cooling the reactor in an ice-bath; samples are removed from time to time so that the progress of the reaction can be followed throughout its course. Unreacted isobutylene is allowed to evaporate from these samples and the residue is assayed (1) by titration with N/10 sodium hydroxide solution to determine unreacted methacrylic acid, and (2) by means of gas chromatography.

TYPICAL REACTION CHART

| Reaction Time (Hours) | Percent Methacrylic Acid | Percent Crude Ester | Percent Conversion |
|---|---|---|---|
| 1 | 52.5 | 47.5 | 32.7 |
| 2 | 38.3 | 61.7 | 47.1 |
| 3 | 31.8 | 68.2 | |
| 4.5 | 25.3 | 74.7 | |
| 6 | 23.2 | 76.8 | |
| 7 | 23.5 | 76.5 | 64.2 |

Quantitative gas chromatography of the crude product shows that in addition to methacrylic acid and tertiary butyl methacrylate which are obtained, small amounts of other products are also observed. Among these are di-isobutylene (4.2%), triisobutylene (1.9%), and tertiary butyl alcohol (0.6%).

When a sample of the reaction mixture is allowed to stand in contact with the catalyst at room temperature overnight, little or no tertiary butyl methacrylate can be isolated because complete reversion of any ester formed has occurred because of the prolonged contact with the catalyst at room temperature. Quantitative recovery of methacrylic acid is observed and all of the isobutylene initially fed can be accounted for as a mixture of di, tri, and tetraisobutylenes. It may be seen from the data that the addition of methacrylic acid to isobutylene is very rapid in the presence of this catalyst and that equilibrium is reached at 0° about five hours after the reactants are initially combined.

*Example II*

The procedure of Example I is repeated with the exception that Catalyst B (10 parts) is substituted for Catalyst A of that example. Samples are taken as set forth in Example I and the data are as follows:

| Reaction Time (Hours) | Percent Methacrylic Acid | Percent Crude Ester | Percent Conversion |
|---|---|---|---|
| 1 | 72.6 | 27.4 | 17.4 |
| 2 | 52.5 | 47.5 | 32.2 |
| 3 | 41.6 | 58.4 | 41.8 |
| 5 | 29.8 | 70.2 | 52.9 |
| 6 | 27.3 | 72.7 | 57.2 |
| 7 | 26.2 | 73.8 | 59.1 |

*Example III*

In a similar fashion, Catalyst C is substituted for Catalyst B in an otherwise identical preparation. The data for this run are as follows:

| Reaction Time (Hours) | Percent Methacrylic Acid | Percent Crude Ester | Percent Conversion |
|---|---|---|---|
| 1 | 61.8 | 38.3 | |
| 2 | 48.3 | 51.8 | 35.2 |
| 3 | 41.5 | 58.5 | |
| 4 | 38.4 | 61.6 | |
| 5 | 34.2 | 65.8 | |
| 6 | 30.1 | 69.9 | |
| 7 | 27.4 | 72.6 | 59.2 |

Gas chromatography shows percent diisobutylene, 4.0; percent triisobutylene, 2.3; and percent tertiary butyl alcohol, 0.9.

*Example IV*

The following experiments are carried out in which the procedures of Example I are repeated exactly, but Catalysts D, E, F, G, H, and I are used in place of A in the respective runs. The next table shows data obtained in terms of percent conversion after 2 hours and 7 hours as related to the nature of the catalyst. The data for these runs are as follows:

| Catalyst | Percent Conversion, Two Hours | Percent Conversion, Seven Hours |
|---|---|---|
| D | 40.7 | 62.3 |
| E | 19.6 | 47.4 |
| F | 9.5 | 23.0 |
| G | 35.2 | 59.2 |
| H | 16.0 | 37.7 |
| I | 18.2 | 42.0 |

*Example V*

A mixture of methacrylic acid (86 parts) and a conventional sulfonated cation exchange resin (10 parts) are mixed and allowed to stand at room temperature overnight. The catalyst is prepared from a sample of a commercially available sulfonic acid cation exchange resin (such as Amberlite IR-120, available from Rohm & Haas Company, Philadelphia, Pennsylvania) which is converted to the hydrogen form and then dried at 110° to 115° (2 mm.) for 16 hours. This particular resin is a sulfonated styrene divinylbenzene copolymer containing 8.5% divinylbenzene. Isobutylene is added in the fashion described for Example I and samples are removed as in Example I. At two hours and at four and one-half hours, not a trace of the desired ester can be found nor after seven hours at 0° is any tertiary butyl methacrylate observable in the chromatogram of the reaction mixture. This chromatogram will show as little as 0.1% conversion. Excess isobutylene is allowed to evaporate from a sample of the reaction mixture and the residue is titrated with dilute sodium hydroxide solution. The residue contains 98.3% pure methacrylic acid. The reaction mixture is transferred to a pressure vessel and allowed to stand for 23 hours at 25° to 30°. Under these conditions, a 5.3% conversion to tertiary butyl methacrylate occurs.

*Example VI*

A conventional ion exchange resin is prepared as follows:

A styrene-divinylbenzene copolymer, prepared using 1% divinylbenzene instead of the customary 8% to 10% divinylbenzene, is sulfonated according to the usual process (concentrated sulfuric acid, 120° C., 6 hours). This material is thoroughly washed with water, dried, and powdered to pass 100 mesh. Finally, the powdered resin is dried at 110° to 115° (2 mm.) for 16 hours. This dehydrated sulfonic acid cation exchange resin is used as a catalyst in the reaction set forth as follows:

A mixture of methacrylic acid (86 parts) and the dried catalyst (10 parts) is allowed to stand overnight at room temperature. The mixture is then cooled to 0° and isobutylene is added during 10 minutes at a temperature between —5° and 0°. The reaction mixture is stirred and cooled at 0° for the next 7 hours. After 7 hours at 0°, no more than a trace of tertiary butyl methacrylate can be detected in the gas chromatogram. After 7 hours, the isobutylene is allowed to evaporate from an aliquot sample. The residue is 97.4% pure methacrylic acid. The reaction mixture is transferred to a pressure vessel and is allowed to stand for 23 hours at 25° to 30°. At that point, a conversion to 16.2% tertiary butyl methacrylate has been attained.

*Example VII*

A mixture of acetic acid (60 parts) and Catalyst D (10 parts) is charged to a reactor at room temperature. To the stirred mixture is added liquid isobutylene (56 parts) which is pre-cooled to —40° C. In the course of the addition, the temperature of the reaction mixture drops to 5°. External cooling is then applied. The reaction mixture is held at 0° and samples are taken every hour to test their conversion to tertiary butyl ester in the usual fashion. After one hour, conversion to tertiary butyl acetate is 74%; after two hours the conversion reaches an equilibrium value of 80.6%.

In a similar fashion, trimethylethylene gives tertiary amyl acetate in good yield and 1,1-diethylethylene is converted to 1-methyl-1-ethylpropylacetate in excellent yield but with low conversion.

*Example VIII*

A section of ¼″ inside diameter tubing is packed with 24.8 parts of Catalyst A. The tube is coiled to fit into a cooling bath, the entrance of the tube is attached to a pressurized feeder and pump assembly and the exit of the tube is connected to a reservoir and let-down valve. An equimolar mixture of acrylic acid and isobutylene are placed in the pressurized feeder and slowly pumped through the catalyst bed. The tube is cooled to 0° and maintained at 0° to 1° C. during the entire course of the run. The mixture is pumped through the tube at a rate such that one tube-volume passes through the tube every 14 minutes. A steady state is reached shortly after the first hour of operation. The tube effluent contains acrylic acid (28%), tertiary butyl acrylate (65.6%), isobutylene (2.5%), diisobutylene (3.4%), and tertiary butyl alcohol (0.4%). The conversion is, therefore, 66.7%, and the yield is in excess of 95%, based on the acrylic acid which is consumed. No apparent loss in catalyst activity appears to have occurred in the course of the passage of 5,000 parts of reaction mixture through the system.

In an entirely similar fashion, a conversion of 58.4% is realized when the contact time is shortened to one minute and the temperature is raised to 20°. Slightly more of the isobutylene is converted to diisobutylene, triisobutylene, and tetraisobutylene under these conditions than is observed at 0°.

*Example IX*

The conditions of Example VIII can be adapted for the preparation of tertiary butyl methacrylate. An equimolar mixture of methacrylic acid and isobutylene is metered to a thermostated reaction coil. A total of 5,680 parts of reaction mixture is passed through 40 parts of the catalyst. At a contact time of six minutes at 15°, 48.6% of the methacrylic acid in the feed is converted to tertiary butyl methacrylate.

In a similar experiment run at 20° and two and one-half minutes' contact time, 51% conversion to tertiary butyl methacrylate is obtained. Similar results are observed when 50 minute contact time at 0° is employed. Somewhat more isobutylene dimer, trimer, and tetramer accompany preparation of tertiary butyl methacrylate than is observed in the preparation of tertiary butyl acrylate. Only traces of material which boiled higher than tetraisobutylene are observed.

In a similar fashion, trimethylethylene and acetic acid are converted to tertiary amyl acetate; the yield, based on acetic acid consumed, is in excess of 95% of the theoretical.

*Example X*

Undecylenic acid (73.7 parts), Catalyst C (4 parts), and isobutylene (22.4 parts) are placed in a pressure bottle and allowed to stand at room temperature for 16 hours. Thirty-six and one-half percent of the undecylenic acid is converted to tertiary butyl undecylenate under these conditions, and small amounts of isobutylene, diisobutylene, triisobutylene, tetraisobutylene, and tertiary butyl alcohol are likewise formed.

*Example XI*

Oxalic acid (13.5 parts), Catalyst A (3 parts), and diethyl ether (40 parts by volume) are placed in a pressure vessel and cooled to −20°. Isobutylene (33.6 parts) is added to the mixture. The pressure vessel is sealed and the reaction mixture is allowed to warm to room temperature with shaking during a two and one-half hour period. All of the oxalic acid dissolves and the reaction mixture becomes warm. It then cools to room temperature. The pressure vessel is cooled in an ice bath and is opened. The catalyst is removed by filtration and the precipitate is washed with ether. The combined organic filtrates are washed with water and then with 10% sodium carbonate solution. The combined ether extracts are stripped of solvent and the product, tertiary butyl oxalate, M.P. 68° to 70°, is obtained in a yield of 44.5% of the theoretical. One-third of the oxalic acid charged is recovered in the aqueous washings so that the yield, corrected for recovered oxalic acid, is 68%.

*Example XII*

A mixture of malonic acid (15.6 parts), Catalyst A (3 parts), and diethyl ether (40 parts) is cooled to −20° in a pressure vessel and liquid isobutylene (33.6 parts) is added. The pressure vessel is sealed and shaken at room temperature for 2½ hours at which point the solid malonic acid has entirely dissolved. The reaction mixture is cooled and filtered, the filtrate is washed with water and then with 10% sodium carbonate solution. The filtrate is dried over anhydrous magnesium sulfate and the solvent is removed under reduced pressure. The residual oil is distilled under reduced pressure to give tertiary butyl malonate, B.P. 102° to 103° (15 mm.), 36% yield, $n_D^{25}=1.4059$.

*Example XIII*

A mixture of pivalic acid (15.3 parts), Catalyst A (3 parts), ether (40 parts by volume), and isobutylene (16.8 parts) is treated exactly as in Example XII. After 2½ hours at room temperature, the conversion to the tertiary butyl ester has reached 49%.

*Example XIV*

A mixture of benzoic acid (18.3 parts), Catalyst A (3 parts), ether (40 parts per volume), and isobutylene (16.8 parts) are shaken in a pressure vessel at room temperature for 2½ hours. The reactor is cooled and vented and the reaction mixture is filtered to remove the catalyst. The filtrate is washed with water and then with a small amount of 10% sodium hydroxide solution. The mixture is dried over anhydrous magnesium sulfate and distilled under reduced pressure in the presence of a trace of potassium carbonate. The product, tertiary butyl benzoate, 14.6 parts, 55% yield, has a B.P. of 80° to 85° (5 mm.).

In a similar fashion, 2-methyl-1-butene and benzoic acid gives tertiary amyl benzoate, isobutylene, and 2-naphthoic acid gives tertiary butyl 2-naphthoate, trimethylethylene and phenylacetic acid gives tertiary amyl phenylacetate, and cyclohexanecarboxylic acid and isobutylene gives tertiary butyl cyclohexanecarboxylate.

*Example XV*

A mixture of methylenecyclohexane (9.6 parts), acetic acid (10 parts), and Catalyst B (1 part) are mixed and warmed at 60° C. for 8 hours. The reaction mixture is washed with water and with 5% sodium bicarbonate solution and is dried over anhydrous magnesium sulfate. The mixture is distilled in the presence of a trace of potassium carbonate to give 1-methylcyclohexyl acetate. The product has a B.P. 93° to 98° (50 mm.), 72° to 75° (10 mm.), and $n_D^{25}=1.441$. In a similar fashion, methylenecyclobutane and acetic acid gives 1-methylcyclobutyl acetate, methylenecyclopentane and propionic acid gives 1-methylcyclopentylpropionate, methylenecycloheptane and benzoic acid gives 1-methylcycloheptyl benzoate, and 1-methylcyclohexene and phenylacetic acid gives 1-methylcyclohexyl phenylacetate.

*Example XVI*

A mixture of 2-methyl-1-hexene (9.8 parts), chloroacetic acid (14 parts), Catalyst A (2 parts), and chloroform (10 parts) is mixed and heated at 50° for 5 hours. The mixture is filtered, washed with water, and dried over magnesium sulfate. Distillation under reduced pressure in the presence of a small amount of potassium carbonate gives 1,1-dimethylpentyl chloroacetate. In a similar fashion, tertiary butyl β-methoxypropionate is prepared from isobutylene and β-methoxypropionic acid, tertiary butyl phenoxyacetate from isobutylene and phenoxyacetic acid, and tertiary butyl cyanoacetate from isobutylene and cyanoacetic acid.

*Example XVII*

Under the conditions set forth in Example I, an equivalent weight of itaconic acid is substituted for the methacrylic acid employed in Example I. Excellent yields of tertiary butyl itaconate are obtained.

*Example XVIII*

Isobutylene is bubbled into a stirred mixture of formic acid (208 parts) and Catalyst A (2 parts). The gas is introduced by means of a gas dispersion tube at a rate of 1 mole per hour. Virtually no isobutylene appears in a Dry Ice trap which is attached to the condenser vent. All of the gas is absorbed quantitatively on introduction until the reaction is nearly complete. Intermittent cooling is required to keep the temperature below 50° C. Breakthrough of isobutylene gas occurs when about 75% of the theoretical amount of isobutylene has been absorbed. When 90% of the theoretical isobutylene has been passed through the mixture, 92% of that charged is absorbed at 42° and above. The temperature is lowered to 20° and the system is saturated with isobutylene and stirred at that temperature for 30 minutes. The catalyst is separated by filtration and the filtrate is washed first with ice cold water, then with cold saturated sodium bicarbonate solution. The organic layer is separated and distilled to give tertiary butyl formate in 80% yield. This result is to be compared with the 43% yield reported in the prior art, using conventional exchange catalysis.

*Example XIX*

In order to investigate further how significant an advantage the macro-reticular catalysts have over the conventional ion exchange catalysts, the following pair of experiments are carried out: A mixture of formic acid (46 parts), tertiary butyl formate (30.6 parts) and isobutylene (56 parts) is placed in a stirred reaction vessel which carries a Dry Ice-cooled reflux condenser. The flask is immersed in an ice bath, and the refluxing mixture is found to stabilize at a pot temperature of $-2.5°$. In one of the units, Catalyst A (0.92 part) is added, in the other, the same weight of the dehydrated acid form of the conventional ion exchange catalyst Amberlite IR-120 (hereinbefore described). The mixtures are stirred and observed. The temperature rises from $-2.5$ to $+1.0°$ in the course of three hours in the macro-reticular exchange resin experiment. In the conventional resin-catalyzed experiment, the temperature rises from $-2.5°$ to $-1.8°$ after four hours. Triethylamine (0.47 part) is added to each of the reaction mixtures, and isobutylene is allowed to evaporate slowly as the Dry Ice in the condenser gradually evaporates. The remaining mixture of formic acid and tertiary butyl formate is titrated with n/10 sodium hydroxide solution to a phenolphthalein end point. If no conversion of formic acid to tertiary butyl formate occurs, the mixture would contain 60.1% formic acid. The run in which Catalyst A is used analyzes for 28.3% formic acid; this corresponds to 40% conversion of the acid to the ester. The run in which the conventional resin is used analyzes for 58.4% formic acid; this corresponds to 1.5% conversion of the acid to the ester. These figures show that the macro-reticular resin is about 25 times as effective as the conventional resin catalyst.

The sulfonic acid type cation exchange resins which exhibit macro-reticular structures are very superior catalysts for a wide variety of hydrogen ion-catalyzed reactions which occur in substantially non-aqueous media. Compared to the sulfonic acid cation exchange resins of the prior art, the resins exhibiting macro-reticular structure will catalyze reactions effectively at much lower temperatures and with much shorter reaction times to give higher yields of high purity products. There are some of the reactions which are conducted in substantially non-aqueous media and catalyzed by hydrogen ion which are effectively catalyzed by the macro-reticular structured sulfonic acid cation exchangers which are not catalyzed at all by the sulfonic cation exchange resins of the prior art.

Furthermore, since it is possible to employ much higher concentrations of polyvinylidene compounds which function as cross-linkers, it is possible to obtain much higher chemical and physical resistance in the macro-reticular structured sulfonic cation exchange resins without any sacrifice of the very efficient catalytic properties which they exhibit. This substantially higher resistance to degradation, either physical or chemical, permits prolonged use with negligible loss of catalytic or operating characteristics.

The differences in the catalytic efficiencies between the sulfonic acid type cation exchange resins of the prior art and the sulfonic acid type cation exchange resins which exhibit macro-reticular structures will depend to some extent at least on the particular reactants being employed in the non-aqueous system. These differences in catalytic efficiencies are well-illustrated in the esterification by olefins of the homologous series of saturated monocarboxylic acids. Thus, the lowest member of the series, formic acid, swells the sulfonic cation exchange resins of the prior art appreciably, and this solvation makes a higher percentage of the sulfonic acid groups in the resin available for catalytic activity. While the sulfonic acid cation exchange resin with macro-reticular structure still exhibits a markedly superior catalytic effect, the differences in catalytic efficiencies are much more in favor of the macro-reticular structured sulfonic cation exchange resins when the higher members of the homologous series, which effect little solvation of the prior art resins, are employed.

The differences in catalytic efficiencies between the sulfonic acid type cation exchange resins of the prior art and the sulfonic acid type cation exchange resins which exhibit macro-reticular structures are not as marked in aqueous media as they are in substantially non-aqueous media. However, the differences in resistance to physical and chemical degration which exist in non-aqueous media also obtain in aqueous media. This results in an important economic advantage for the resins with macro-reticular structure from the standpoint of repeated re-use.

The reactions set forth hereinafter are typical of the wide variety of reactions effectively catalyzed by the sulfonic acid type cation exchange resins which possess macro-reticular structure.

ADDITION OF CARBOXYLIC ACIDS TO OLEFINS WHICH YIELD SECONDARY ALKYL ESTERS

The conditions which are required to catalyze the addition of carboxylic acids to olefins which yield secondary alkyl esters are considerably more stringent than those which are needed to give addition of carboxylic acids to olefins which yield tertiary alkyl esters. The use of macro-reticular cation exchange resins in the acid form has permited addition of carboxylic acids to these less reactive olefins to give significantly higher yields and shorter reaction times under milder conditions than can be obtained with the prior art ion exchange resins. The following preparations illustrate the scope of the process and in some instances show direct comparisons of the relative activities of macro-reticular and conventional ion exchange catalysts:

A mixture of methacrylic acid (86 parts), hydroquinone (0.5 part), benzoquinone (0.5 part), and Catalyst A (10 parts) is charged to a pressure vessel. The pressure vessel is pressurized with ethylene at 2000 lbs. per square inch, sealed and heated to 160° C. with agitation. In the course of two hours at 150° to 160° C., reaction occurs. The vessel is cooled and unreacted ethylene is vented. The residue is filtered to separate the catalyst, and the filtrate is distilled under reduced pressure. The product, ethyl methacrylate, B.P. 117.5° to 119.5° (760 mm.), $n_D^{25}$ 1.4115, is obtained in a yield of 80% based on methacrylic acid which is consumed in the process.

Similarly, a mixture of methacrylic acid (86 parts), hydroquinone (0.5 part), benzoquinone (0.5 part), and Catalyst A (10 parts) is charged to a pressure vessel and propylene (80 parts) is added. The vessel is sealed, agitated and heated. At a temperature of about 60°, an exothermic reaction becomes evident and the temperature rises to 114° before natural cooling occurs. In the course of the reaction, the pressure reaches a maximum pressure of 475 p.s.i. at 92° and drops to 175 p.s.i. at 105°. A total reaction period of one hour is employed. The reaction mixture is cooled and vented, and the product is separated from the catalyst by filtration. The filtrate is distilled under reduced pressure to give isopropyl methacrylate, B.P. 54° (50 mm.), $n_D^{25}$ 1.4087. The yield of ester is 85% based on acid charged.

In another experiment, Catalyst A (40 parts) is charged to a ¼″ inside diameter stainless steel tube which is bent around a mandrel to form a helical coil 8″ in outside diameter. The coil is connected to an inlet and outlet system as follows:

The inlet system comprises separate reservoirs and pumps for feeding liquid propylene and anhydrous methacrylic acid to a mixing chamber. This in turn is connected by means of a valve to the coil reactor. The outlet system consists of a product reservoir and let-down valve. Liquid propylene (470 parts) under nitrogen at 300 lbs. per square inch and methacrylic acid (900 parts) containing hydroquinone (1.5 parts) are simultaneously pumped into the coil reactor. The product reservoir is prepressurized with nitrogen to 2000 lbs. per square inch. The coil is placed in a bath which may be heated to any suitable temperature. The extent of conversion of methacrylic acid to isopropyl methacrylate may be ascertained by titration of an aliquot of the product dropped from the receiver from time to time. The conversion is a function of the temperature which is employed and of the flow rate (hence, the contact time) at which the reactants are pumped through the reactor. Conversion to isopropyl methacrylate occurs at temperatures as low as room temperature. As the temperature is raised, at a given contact time, the conversion approaches the equilibrium value. At equilibrium for the system, methacrylic acid-propylene there is 16% to 17% methacrylic acid present in the effluent at 80° C. Equilibrium is achieved at a feed rate of 5 parts by volume per minute at 80° C. At 60° under the same conditions, a conversion of approximately 70% of the equilibrium value is obtained. The mixture of unreacted propylene, unconverted methacrylic acid, and isopropyl methacrylate together with trace amounts of propylene dimer, trimer, and tetramer are collected continuously during the course of the run. Methacrylic acid is quantitatively accounted for as either unreacted starting material or isopropyl methacrylate; the yield of isopropyl methacrylate based on methacrylic acid consumed is 100%. At equilibrium at 80° C., approximately 75% of the methacrylic acid fed is converted to isopropyl methacrylate. The yield based on propylene consumed is in excess of 80% of the theoretical.

In an entirely similar fashion are prepared isopropyl acrylate from propylene and acrylic acid, isopropyl acetate from propylene and acetic acid, and isopropyl 2-ethylhexoate from propylene and 2-ethylhexoic acid.

When solid carboxylic acids are employed, it is entirely feasible to feed a preformed mixture of propylene and the carboxylic acid or, alternatively, to use the isopropyl ester as part of the feed in order to be able to pump the feed as a liquid. It is also possible to pump the acid in the molten form into the reactor. In this fashion, isopropyl benzoate may be prepared from propylene and benzoic acid; isopropyl adipate may be obtained from propylene and adipic acid; and isopropyl itaconate may be obtained from propylene and itaconic acid.

The apparatus described in the preceding experiment is employed for the preparation of secondary butyl methacrylate from a mixture of cis- and trans-butene-2 and methacrylic acid. Thus, a mixture of the butenes (256 parts), methacrylic acid (516 parts), and hydroquinone (1 part) is charged to the inlet system. The reaction is carried out at 80°. At this temperature the equilibrium conversion of the reactants to the ester is approximately 66% at 1:1 mole ratio. At a pumping rate of 25 parts by volume per minute, which corresponds to a contact time of approximately 2 minutes, 95% of the theoretical equilibrium value is attained. When the contact time is doubled to 4 minutes, conversion of the acid to the ester reaches 65% or approximately 98% of the equilibrium value. When the temperature is lowered to 60° and a contact time of 40 minutes is employed, the conversion drops to 47% which is 72% of the equilibrium value. At 40° under the same conditions, 10% conversion is realized. Ester is formed even at temperatures of 20° C. and below, but the rate of formation becomes impractically low.

When the reactor is packed with a conventional ion exchange resin in the dehydrated acid form (Amberlite IR-120, hereinbefore described), only 24% conversion to secondary butyl methacrylate is obtained at 80° C. with a contact time of 40 minutes. Thus, when the prior art catalyst is used, 20 times the time is required to attain only ⅗ of the conversion observed when the macro-reticular catalyst is employed under the same conditions.

In a similar fashion are prepared secondary butyl acetate from acetic acid and butene-2, secondary butyl pivalate from butene-2 and pivalic acid, and secondary butyl pelargonate from butene-2 and pelargonic acid.

The reaction tube employed in the two preceding experiments is packed with Catalyst C (40 parts), and a mixture of butene-1 (346 parts), acrylic acid (432 parts), and hydroquinone (1 part) are placed in the inlet system. In this system, the equilibrium conversion value corresponds to approximately 73% conversion to secondary butyl acrylate at 80° C. and a 1:1 mole ratio of reactants. Use of a contact time of ten minutes at 80° gives 71% conversion to the desired product; doubling the contact time to twenty minutes produces virtually no change in conversion, a rise to 72% being observed. The yield based on acrylic acid which is consumed is quantitative. The yield based on butene-1 consumed is about 80%. Mechanical losses account for most of this loss and dimerization of the butene to branched chain octenes accounts for most of the remainder. For the most part, the butenes which are not converted are found to be isomerized to a mixture of cis- and trans-butene-2. All three possible straight-chain butenes are evident in a gas chromatogram of the recovered olefin. The chromatogram of the olefin recovered in this experiment resembles very closely that of the recovered butenes when the mixture of cis- and trans-butenes-2 are used as in the preceding experiment.

In a similar fashion, formic acid and butene-1 give secondary butyl formate, chloroacetic acid and butene-1 gives secondary butyl chloroacetate, and 2,2,4,4-tetramethylpentanoic acid and butene-1 give secondary butyl 2,2,4,4-tetramethylpentanoate.

In another experiment, a mixture of octene-1 (22.4 parts), acetic acid (12 parts), and Catalyst A (2 parts) are stirred and heated at 100° C. From time to time, samples of the reaction mixture are removed and titrated for unchanged acetic acid. The drop in acid concentration per gram of reaction mixture is a function of the rate at which secondary octyl acetate is being formed in this reaction. A similar experiment in which a conventional ion exchange resin (Amberlite IR-112, a sulfonated styrene-divinylbenzene copolymer, 4.5% divinylbenzene available from Rohm & Haas Company, Philadelphia, Pennsylvania) in the dehydrated hydrogen ion form is used as catalyst is carried out at the same time. A plot of the data which are obtained shows that rough second order rate constants can be calculated for the first portion of the reaction. The rate constant for the macro-reticular catalyst system is three times that of the conventional resin. Furthermore, when the prior art resin is employed, the reaction practically ceases when the conversion has proceeded to only 39% of theoretical value. The corresponding level-off point in the case of the macro-reticular catalyst is at 73.5% conversion, the latter figure very probably representing the true equilibrium concentration.

When dodecene-1 is used in a similar reaction, the ratio of the rate constants is also found to be approximately 3. Again, a cut-off point is observed in the case of the preparation of secondary dodecyl acetate which is much lower for the prior art resin than for the macro-reticular species. When methacrylic acid is used instead of acetic acid in these experiments, the ratio of the rate constants rises from 3 to more than 30. This shows that higher molecular weight carboxylic acids are much more sensitive to the structural features of the catalysts involved than are the first members of the series.

A mixture of octadecene-1, acrylic acid, and Catalyst A in a 1:1:0.05 molar ratio are heated at 110° for six hours.

The reaction mixture is cooled and washed with dilute sodium carbonate solution. The organic layer is distilled under reduced pressure to give secondary octadecyl acrylate in the high yield based on acrylic acid consumed, but in low conversion based on acrylic acid charged.

In a similar fashion, 11-tricosene reacts with acrylic acid at 110° for 8 hours to give secondary tricosanyl acrylate, as is shown by the infrared spectrum of the resulting reaction mixture after removal of unchanged carboxylic acid by extraction with dilute sodium hydroxide solution.

In a similar fashion, cyclopentene reacts with acetic acid in the presence of Catalyst C at a 1:1:0.05 molar ratio of reactants to give a high yield of cyclopentyl acetate. The reaction is carried out under reflux and is essentially complete in two hours. Similarly, cyclohexene gives cyclohexyl propionate when a mixture of cyclohexene and propionic acid are contacted in a similar fashion with Catalyst D, and norbornene reacts with acrylic acid to give norbornyl acrylate in a similar fashion.

LACTONE FORMATION

Open chain carboxylic acids in which a double bond is present in the β,γ- or γ,δ-position with respect to the carboxyl group, or compounds which may be converted to such intermediates, are easily cyclized to the corresponding γ-lactones when heated in the presence of a macro-reticular structured sulfonic cation exchange resin in the dehydrated acid form. Thus, 4-pentenoic acid gives γ-valerolactone, 3-butenoic acid gives γ-butyrolactone, 4-methyl-4-pentenoic acid gives γ-methyl-γ-valerolactone; 4-methyl-4-hexenoic acid gives γ-ethyl-γ-valerolactone; 4-phenyl-3-butenoic acid gives γ-phenyl-γ-butyrolactone; and 5-phenyl - 4 - pentenoic acid gives γ-benzyl-γ-butyrolactone. Furthermore, methyl-4-pentenoate when heated with acetic acid in the presence of macro-reticular structured sulfonic cation exchange resins in the dehydrated acid form gives methyl acetate and γ-valerolactone. Likewise, ethyl 4-pentenoate gives ethyl propionate and γ-valerolactone when it is heated with the resin catalyst and propionic acid. 10-undecenoic acid (undecylenic acid) upon prolonged heating with macro-reticular cation exchange resins in the acid form, undergoes double bond migration from the terminal position. Finally, when the double bond has reached the γ,δ-position, cyclization can occur and γ-n-heptyl-γ-butyrolactone results.

In a similar fashion, oleic acid yields γ-tetradecyl-γ-butyrolactone.

Illustrative of such reactions are the following:

A mixture of acetic acid (66 parts), methyl 4-pentenoate (114 parts), and Catalyst A (5 parts) is placed in the pot of a distillation column and is heated to total reflux. At a pot temperature of about 90°, methyl acetate (B.P. 54°) distills as rapidly as it forms. The pot temperature is held below 130° during the entire course of the run. When 95% of the theoretical amount of methyl acetate has been collected in the receiver, the residue is filtered and the filtrate is distilled under reduced pressure to give γ-valerolactone in 88% of the theoretical yield (B.P. 205° (760 mm.), D. 1.074). In a similar fashion, methyl 4-methylpentenoate gives γ-methyl-γ-valerolactone and methyl acetate in 93% yield.

Similarly: 4-pentenoic acid (100 parts) and Catalyst A (3 parts) are heated at 100° C. for 4 hours. The reaction may be followed either by determination of the refractive index at intervals or by titration of an aliquot for unreacted carboxylic acid. When conversion of the carboxylic acid is nearly complete, the product is decanted from the catalyst and distilled under reduced pressure to give γ-valerolactone in nearly quantitative yield, when corrected for that material which remains in contact with the catalyst.

Undecylenic acid (18.4 parts) and Catalyst C (2 parts) are heated at 140°. At intervals, samples of material are scanned as films in the infrared region of the spectrum. As heating proceeds, a peak at 1770 cm.$^{-1}$ appears in the spectrum; and this peak becomes larger and larger with time. After 8 hours at 140°, the magnitude of the peak corresponds to a 25% conversion of undecylenic acid to γ-n-heptyl-γ-butyrolactone. The lactone may be isolated by extractively removing the carboxylic acid with cold dilute sodium hydroxide solution and distilling the alkali-insoluble material.

Oleic acid (28.2 parts) and Catalyst A (4 parts) are heated at 150° for 24 hours. At this point, a 30% conversion to γ-n-tetradecyl-γ-butyrolactone is indicated by the magnitude of the peak of 1770 cm.$^{-1}$.

A mixture of methyl undecylenate (19.8 parts), acetic acid (6 parts), and Catalyst A (1 part) is heated at 115° for 8 hours. Methyl acetate is formed and the presence of γ-n-heptyl-γ-butyrolactone is evident by inspection of the infrared absorption spectrum.

ALKYLATION OF AROMATICS

Typical of such reactions are the following:

A mixture of toluene (92 parts) and Catalyst A (7.5 parts) is charged to a stainless steel rocking autoclave. The autoclave is sealed and propylene (41 parts) is introduced into the reaction mixture. Heat is then applied and a maximum pressure of 300 pounds per square inch at 100° is observed. At this point, heating is discontinued and the temperature is observed to rise slowly to 120°. The pressure drops to 250 pounds per square inch at 112°, and within 11 minutes reaches 100 pounds per square inch at 120°. The reactor is then cooled and vented. The reaction mixture is separated from the catalyst by filtration, and the filtrate is distilled under reduced pressure. The product (38 parts) has a boiling point of 176°–177° (760 mm.), $n_D^{25}$ 1.4907. High-boiling products are obtained which boil at 130°–135° (50 mm.) (11 parts), $n_D^{25}$ 1.4919 and B.P. 156°–159° (50 mm.) (5.5 parts), $n_D^{25}$ 1.4912. The infrared absorption spectra of all three of these cuts are carefully examined. The main product cut contains major amounts of ortho-isopropyltoluene (ortho-cymene) and lesser amounts of meta- and para-isopropyl-toulenes. The product in the intermediate boiling range is largely 2,4-diisopropyltoluene; the highest boiling product is largely 2,4,6-triisopropyltoluene.

Toluene (36.8 parts), tetrapropylene (33.6 parts), Catalyst A (2 parts), and glacial acetic acid (0.6 part) are heated for 6 hours under reflux at 123°. The catalyst is removed by filtration and the filtrate is freed of unreacted starting materials by heating to a distillation pot temperature of 205° at atmospheric pressure. The residue is distilled under reduced pressure to give the product, B.P. 160° to 176° (25 mm.). The product is equivalent to that obtained in the conventional manner by alkylation of toluene with tetropropylene in the presence of concentrated sulfuric acid as shown by examination of the infrared absorption spectrum. The product obtained in this way by means of the use of macro-reticular exchange resin catalysis has a rather narrower boiling range than is usually obtained when sulfuric acid is employed.

These results should be contrasted with the experience of Loev and Massengale (J. Org. Chem. 22, 988 (1957)), who reported their inability to alkylate aromatic hydrocarbons when employing the prior art sulfonic acid type cation exchange resins as catalysts.

ALKYLATION OF PHENOLS

A direct comparison of the reactivity of a macro-reticular sulfonic cation exchange resin in the dehydrated acid form with the dehydrated acid form of a sulfonic cation exchange resin in the alkylation of phenol with diisobutylene has been carried out according to the methods described by Loev and Massengale (J. Org. Chem. 22, (1957)). Parallel experiments were carried out as follows:

Phenol (94 parts), diisobutylene (124 parts), and the dehydrated acid form of the sulfonic cation exchange resin catalyst (0.75 part) were placed in a dry 500-ml. 3-necked flask and heated at 70° to 75° under an atmosphere of dry nitrogen. The catalyst was removed by filtering the hot reaction mixture and the p-tert-octylphenol (B.P. 140° to 180°/20 mm.) was distilled from the reaction mixture under reduced pressure. The results of these comparative tests are set forth in Table II.

TABLE II

| Catalyst | Reaction Time (Hours) | Percent Yield [3] |
| --- | --- | --- |
| Resin B [1] | 1 | 7.3 |
| Resin B | 8 | 59 |
| Resin B [4] | 8 | 53 |
| Catalyst A [2] | 1 | 57 |

[1] Resin B is the dehydrated acid form of a cation exchange resin prepared by sulfonating a styrenedivinylbenzene copolymer containing 4.5% divinylbenzene (Amberlite IR-112, Rohm & Haas Company, Philadelphia, Pennsylvania).
[2] Catalyst A—See Table I.
[3] "Yield" as used herein is defined as $$\frac{\text{moles of p-tert-octylphenol}}{\text{moles of phenol originally charged}} \times 100$$

[4] These data are the data reported by Loev and Massengale.

The data set forth in Table II clearly show the marked superiority of the macro-reticular structured sulfonic cation exchanger over a typical sulfonic cation exchanger of the prior art. It is at least eight times as active as a catalyst for the addition of diisobutylene to phenol. These data (since they are single runs) do not show the superior resistance of the macro-reticular structured resin to physical and chemical degradation. Catalyst A contains 20% divinylbenzene and thus is a very highly cross-linked resin. Such highly cross-linked macro-reticular structured resins exhibit excellent resistance to physical and chemical degradation, which, as hereinbefore set fourth, is a very real economic advantage because of the much longer life of the catalyst on repeated re-use.

Another property of the macro-reticular structured sulfonic cation exchange resins is the high selectivity exhibited when used as catalysts for the alkylation of phenols with octenes and nonenes. At about a 1:1 ratio of olefin to phenol, only a negligible amount of the di-substituted phenol is obtained. Surprisingly, however, if a large excess of olefin is used (from about 2 to about 5 moles olefin per mole of phenol), excellent yields of the di-substituted phenol are obtained. A typical experiment employing a 5:1 molar ratio of nonene to phenol in which the di-substituted phenol constitute more than 75% of the phenolic product is as follows:

Phenol (47 parts) and Catalyst A (17.3 parts) are charged to a reactor and warmed to 40°. Propylene trimer (292 parts) is added slowly whereupon the reaction temperature rises to 60°, then falls to 53° as the addition is completed. In the course of 30 minutes, the reaction mixture temperature is raised to 70° and then the mixture is heated for 2 hours at 70° to 75°. The reaction mixture is filtered while hot and the filtrate is distilled at 15 mm. to give Cut A to 50° (131 parts); Cut B to 145° (7 parts); Cut C to 195° (42.5 parts); Cut D to 195°–210° (14 parts); Cut E to 210°–225° (11 parts); residue 7 parts. Cut C is a mixture of mono-nonylphenol (22 parts) and nonene dimer (20.5 parts). Cut D and Cut E together contain 120 parts of dinonylphenol and 5 parts of mono-nonylphenol. Thus, 98% of the phenol charged is accounted for as either nonyl- or dinonylphenol and the ratio of di- to monoalkylphenol is approximately 4:1.

The following table shows the data on experiments conducted at different temperatures and different mole ratios using Catalyst A, propylene trimer and phenol:

| Mole Ratio | Temp. Range | Time (Hours) | Cut C (Parts) | Cut E (Parts) |
| --- | --- | --- | --- | --- |
| 2:1 | 70–75 | 2 | 71 | 55 |
| 2:1 | 110–115 | 2 | 70 | 59 |
| 3:1 | 110–115 | 2 | 71 | 78 |
| 3:1 | 110–115 | 4 | 57 | 97 |
| 5:1 | 60–65 | 10 minutes | 64 | 14 |
| 5:1 | 70–75 | 2.5 | 42.5 | 111 |

An experiment was conducted under the same reaction conditions except that a prior art sulfonic cation exchange resin was substituted for Catalyst A. Using a nonene to phenol ratio of 5:1, and after heating at 70°–75° for 2 hours, the Cut C fraction of the reaction mixture was 80 parts and the Cut E fraction only 2.6 parts. A comparison of these data with the preceding data for Catalyst A clearly shows the unusually high catalytic effectiveness of the sulfonic cation exchange resin which has a macro-reticular structure.

Similarly: A mixture of phenol (18.8 parts), ether (20 parts by volume), and Catalyst A (2 parts) are mixed in a pressure vessel. The pressure vessel is cooled to −10° C. and isobutylene (22.4 parts) is added as a liquid. The pressure vessel is closed and is agitated for 3 hours. Considerable heat is evolved as the mixture warms and the reaction is essentially complete after 3 hours. The pressure vessel is cooled and vented, and the reaction mixture is filtered. The filtrate is stripped of solvent and distilled under reduced pressure to get p-tert-butylphenol (18.9 parts, 63% conversion, B.P. 160°–167° (75 mm.)) and recovered phenol, 5.8 parts, 31%. Thus, the yield of p-tert-butylphenol based on phenol consumed was 93% of the theoretical.

POLYMERIZATION OF OLEFINS

The sulfonic acid cation exchange resins described hereinbefore also function very effectively as catalysts for the polymerization of olefins. The following experiment sets forth the details of such a reaction:

A mixture of isobutylene (11.2 parts) and Catalyst A (2 parts) are weighed into a pressure bottle at −20°. The pressure vessel is closed and allowed to warm to room temperature slowly. After 15 minutes at room temperature, the reaction vessel becomes warm and after 25 minutes is hot. The reaction is complete and the mixture returns to room temperature within 45 minutes. The reactor is opened and vented. A loss of only 0.5 part by weight shows that more than 95% of the isobutylene which has been charged has been converted to polymers. The products are di-, tri-, and tetraisobutylenes in weight ratios of 1:2:1. No product boiling higher than tetraisobutylene is present. The presence of small amounts of acetic acid or of tertiary butyl acetate increases the rate of polymerization beyond that shown here.

Similarly, a mixture of nonenes (tripropylene, B.P. 134°–137° (760 mm.) and Catalyst A (5 parts) is heated at 130° for 8 hours. The refractive index rises from $n_D^{25}$ 1.4200 to $n_D^{25}$ 1.4400 at the end of this period; three-quarters of this change occurs during the first two hours. The mixture is cooled and filtered, and the filtrate is distilled to give recovered nonenes (37.5 parts), an intermediate cut, B.P. 71°–145° (20 mm.), 7.5 parts, the product cut, B.P. 145°–176° (20 mm.), 53 parts, $n_D^{25}$ 1.4523, and residue (6 parts).

When this run is repeated using a 16-hour reaction period and acetic acid (5 parts) as an adjuvant, the product, B.P. 140°–180° (20 mm.), 57 parts is obtained.

When the reaction is repeated with a 12-hour reaction period and with sulfolane (5 parts) as an adjuvant, 51 parts of product, B.P. 145°–177° (20 mm.), is obtained.

When Catalyst A was replaced by an equal weight of a dehydrated sulfonic acid cation exchanger of the prior art, prepared by the sulfonation of a divinylbenzene (4.5%)-cross-linked polystyrene, no change whatsoever occurred in the initial refractive index, $n_D^{25}$ 1.4200, after boiling at 135° for 72 hours. After this time, the reaction mixture was filtered and the filtrate was distilled to give recovered starting material, B.P. 134°–137°, $n_D^{25}$ 1.4200, 117 parts, and a residue, 3 parts, $n_D^{25}$ 1.4200. Thus, not a trace of dinonene was obtained under these conditions.

A mixture of diisobutylene (112 parts) and Catalyst A (5 parts) is stirred together. A mildly exothermic reaction occurs. Heat is then applied and the mixture begins to boil at a pot temperature of 103°. Within several minutes, the pot temperature rises to 130°, which condition is maintained for 3 hours. The index of refraction rises from an initial value of $n_D^{25}$ 1.4081 to a value of $n_D^{25}$ 1.4563 after 1.5 hours. After an additional 1.5 hours, the index of refraction advances only to $n_D^{25}$ 1.4372. The mixture is cooled and filtered and the filtrate is distilled. Triisobutylene (40 parts), tetraisobutylene (50 parts) and unchanged diisobutylene are isolated. The formation of triisobutylene in large quantities demonstrates that reversion of these polymers to the monomer, isobutylene, must occur; it is possible that part of the loss in weight (7 parts) which is observed is due to the failure to collect any gaseous products which are not condensed by the cold water condenser.

This experiment is repeated using only 1 part of Catalyst A. Heating is discontinued as soon as the temperature in the pot reaches 130°. This requires three hours. Upon distillation, the products are found to be triisobutylene (27 parts) and tetraisobutylene (42 parts) as well as unchanged diisobutylene (37 parts). A loss of 6 parts may in part be due to monomer escape. The alteration of tri- to tetraisobutylene ratio from 1.5 to 1.25 on heating for an additional period suggests that, in part, tri- is formed at the expense of tetraisobutylene.

A mixture of propylene tetramer (168 parts) and Catalyst A (5 parts) are heated at 130° with stirring. After 8 hours of heating, the refractive index of the mixture rises from $n_D^{25}$ 1.4348 to $n_D^{25}$ 1.4400. The mixture is filtered and distilled under reduced pressure to give cut 1, B.P. 80° to 100° (25 mm.), 85 parts, cut 2, B.P. 100° to 180° (20 mm.), 26 parts, and cut 3, didodecene, B.P. 180° to 216° (20 mm.), 42 parts, 25% conversion.

KETONE CONDENSATION

A mixture of methyl hexyl ketone (256 parts) and Catalyst A (10 parts) is boiled under reflux in an apparatus fitted with a Dean-Stark water separator. The pot temperature rises from 145° to 163° in 50 minutes, at which point water, 9 parts, has separated. This corresponds to 50% of the theoretical amount. The mixture is filtered and distilled to give 7-methylpentadec-7-en-9-one, B.P. 120° to 130° (2.0 mm.), and is obtained in yield of 76% based on methyl hexyl ketone consumed. The ratio of product to residue is 3.2. The residue is almost entirely a $C_{24}$ isophorone mixture, B.P. 200° (1 mm.).

When this reaction was repeated, but using a conventional cation exchange resin of the prior art in the acid form (30 parts) in place of Catalyst A, water (6.9 parts) was separated during 20.5 hours under reflux (pot temperature 172° to 182.5°). Thus, the rate of the reaction using a macro-reticular ion exchange resin catalyst is at least 50 times that of the conventional resin.

A mixture of cyclohexanone (100 parts) and Catalyst A (1 part) is boiled under reflux for 20 minutes. During this time the pot temperature rises from 130° to 158° and water (4.2 parts) separates. The reaction mixture is cooled and filtered, and the filtrate is distilled under reduced pressure to give 2-cyclohexenylcyclohexanone, B.P. 100° to 105° (1.4 mm.), 33 parts, $n_D^{25}$ 1.5035. The product to residue ratio is 4.7 which corresponds to 82% yield based on ketone utilized.

A mixture of n-butyraldehyde (100 parts) and Catalyst A (1 part) are boiled under reflux using a Dean-Stark trap to enable water to be separated in the course of the reflux period. After 1 hour, water (8 parts) is separated, and the pot temperature has risen from 74° to 95° during this period. 2-ethylhex-2-enal, B.P. 175° to 180° (760 mm.), $n_D^{26}$ 1.4485 is obtained in 63% conversion and 85% yield. The ratio of product to residue is 5.9.

When the dehydrated acid form of a conventional prior art sulfonic acid resin prepared by sulfonating a cross-linked copolymer of styrene and divinylbenzene (4.5% divinylbenzene) was substituted for Catalyst A, the time required rose to 2.3 hours. The conversion dropped to 35%, and the yield dropped to 60%. The product to residue ratio dropped to 1.9. Thus, not only does the use of the conventional catalyst require more than double the time which was required by the macro-reticular ion exchange resin catalyzed process, but also the conventional catalyst gave a much less favorable product to residue ratio. Thus, it appears that the primary product of condensation finds it difficult to diffuse away from the sulfonic acid reaction site in the conventional resin catalyst; hence, further self-condensation occurs with consequent destruction of the product. When the macro-reticular catalysts are employed, diffusion of the product of the condensation from the reaction site can easily occur and relatively little destruction of the product occurs due to self-condensation.

ACYLATION OF OLEFINS

A mixture of diisobutylene (224 parts), acetic anhydride (224 parts), and Catalyst A (10 parts) is stirred at room temperature for 5 hours, then allowed to stand overnight. Within twenty minutes, the initial two-phase liquid mixture consolidates to a single phase. At this point, the refractive index is $n_D^{25}$ 1.3983 and an 0.4 ml. aliquot requires 30.8 ml. of 0.1 N sodium hydroxide solution for neutralization to a phenolphthalein end-point. After remaining overnight at room temperature, the refractive index has risen to $n_D^{25}$ 1.4038 and an 0.4 ml. aliquot requires 29.1 ml. of 0.1 N sodium hydroxide solution for neutralization. The mixture is then warmed to 50° for 1 hour and to 60° for 21 hours. At this point, the refractive index is $n_D^{25}$ 1.4091 and the titration value is 27.5 ml. The resin is separated by filtration and the filtrate is distilled at atmospheric pressure to remove unchanged diisobutylene, acetic acid, and acetic anhydride. That material which boils above 145° (760 mm.) is distilled at 50 mm. to give the product, B.P. 110° to 112° (50 mm.), 85 parts. The product is 3,5,5-trimethylhept-3-en-2-one, a compound which has been prepared previously by homogeneous catalysis but never before been formed using ion exchange catalysis.

ACYLATION OF AROMATICS

A mixture of anisole (54 parts), acetic anhydride (51 parts), and Catalyst A (5 parts) is heated for 8 hours at 130° to 140°. The mixture refluxes at 140°. The catalyst is separated by filtration, and the filtrate is distilled to give p-methoxyacetophenone, B.P. 142° to 146° (20 mm.), $n_D^{25}$ 1.5519, 27.5 parts, which crystallized on cooling. The analytical data and infrared spectrum are in accordance with the structure of p-methoxyacetophenone for this reaction product. The yield was 37% based on the anisole charged. Examination of the infrared spectrum of the residue showed that the primary side reaction in this process leads to formation of tris-(p-methoxyphenyl)benzene. It has been shown to be primarily the 1,3,5-trisubstituted derivative contaminated with some of the 1,2,4-product.

When acetic anhydride (51 parts) is refluxed with xylene (53 parts) for 12 hours at 127°, the product, B.P. 125° to 130° (10 mm.) $n_D^{25}$ 1.5210 is dimethylacetophenone. The infrared spectrum is fully consistent with this formula for the reaction product. Again, a high boiling residue remained which was shown to contain tris-(dimethylphenyl)benzene.

To phenol (47 parts) and Catalyst A (5 parts) heated at 110° is added acetic anhydride (51 parts) dropwise.

Addition is completed in 35 minutes and no exotherm is noted during the entire addition. Five minutes after the addition of anhydride is complete, all trace of anhydride has disappeared from the infrared spectrum of the reaction mixture. The reaction mixture is held at 130° for 8 hours and is then boiled under reflux for an additional 8 hours; the temperature drops in the interim from 145° to 136°. The catalyst is removed by filtration, and the filtrate is distilled under reduced pressure. The major product recovered is phenyl acetate, B.P. 92° to 98° (19 mm.), 34 parts, $n_D^{26}$ 1.5178. From the residue is obtained a fraction, B.P. 135° to 153° (1.5 mm.), 4.5 parts, $n_D^{26}$ 1.5553. This cut solidifies and the crystalline solid is separated by filtration. The solid has a M.P. 104° to 105° and on recrystallization is shown to be identical with p-hydroxyacetophenone both by infrared spectrum and melting point. Some ortho-hydroxyacetophenone is present in the phenyl acetate cut.

DECOMPOSITION OF CUMENE HYDROPEROXIDE TO PHENOL AND ACETONE

A mixture of acetone (25 parts) and Catalyst A (2 parts) are heated to reflux and a 70% cumene hydroperoxide solution in cumene (44 parts) is added dropwise under reflux. The addition requires 3.5 hours. Scans of the infrared spectrum from time to time in the course of the addition show that the hydroperoxide peak at 12.0 microns is absent. This implies that the conversion of the hydroperoxide to phenol and acetone takes place as rapidly as the addition is carried out. The catalyst is separated by filtration and the reaction mixture is distilled to give acetone, cumene, 11.5 parts, and phenol, 13.5 parts, B.P. 180° to 184°. The yield of phenol was 17.6 parts, 93% based on cumene hydroperoxide initially present.

This simple acetone reflux procedure to give a 93% yield of phenol based on cumene hydroperoxide is to be compared with the prior art. In the first of the two examples of the prior art, a 200 ml. sample of cumene solution containing 30 grams of cumene hydroperoxide was heated with 20 parts of Zeo-Karb-H (a sulfonic acid type cation exchanger prepared by the sulfonation of coal) at 90° for one hour. A 56.8% yield of phenol was obtained. In the second example of the prior art, 200 ml. of the solution containing 31 grams of cumene hydroperoxide in cumene was passed through a column charged with sulfonated coal. The column was heated externally at 95° to 100°, and the residence time of the mixture of the column was 2 hours. Fifty-one percent of the peroxide in the solution was converted into phenol. It is apparent that the process in hand is very much superior to that of the prior art.

VON PECHMANN REACTION

Resorcinol (11 parts), ethyl acetoacetate (13 parts), Catalyst A (2 parts), and iso-octane (20 parts by volume) are boiled in a reactor fitted with a fractionating column. Ethanol and water are removed by distillation during the course of a 7-hour reaction period. The pot temperature rises from 74° to 115° during this period. A total of 6 parts by volume is removed. The product crystallizes and is recrystallized from boiling alcohol. There is formed 4-methyl-7-hydroxycoumarin, 12 parts, M.P. 179° to 180°. The prior art describes the use of 50 mole percent of catalyst, powdered Amberlite IR-120H, a conventional prior art sulfonic acid cation exchange resin containing 8.5% divinylbenzene (available from Rohm & Haas Company, Philadelphia, Pa.) to carry out the same and analogous reactions.

I claim:

1. A process for the preparation of esters in non-aqueous media which comprises reacting at a temperature from about −20° C. to about 50° C. (1) an olefin containing four to eight carbon atoms of the structure

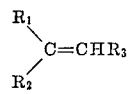

in which $R_1$ and $R_2$ are alkyl groups of 1 to 2 carbon atoms and $R_3$ is $-C_{n-1}H_{2n-1}$ in which $n$ is an integer from 1 to 3 and (2) HCOOH in the presence of a dehydrated sulfonic acid cation exchange resin which possesses a macro-reticular structure, removing the cation exchange resin from the reaction mixture, and recovering the ester so formed.

2. A process for the preparation of esters in non-aqueous media which comprises reacting at a temperature from about −20° C. to about 50° C. (1) an olefin containing four to eight carbon atoms of the structure

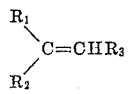

in which $R_1$ and $R_2$ are alkyl groups of 1 to 2 carbon atoms and $R_3$ is $-C_{n-1}H_{2n-1}$ in which $n$ is an integer from 1 to 3 and (2) HOOC–COOH in the presence of a dehydrated sulfonic acid cation exchange resin which possesses a macro-reticular structure, removing the cation exchange resin from the reaction mixture, and recovering the ester so formed.

3. A process for the preparation of esters in non-aqueous media which comprises reacting at a temperature of from about −20° C. to about 50° C. (1) an olefin containing four to eight carbon atoms of the structure

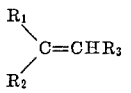

in which $R_1$ and $R_2$ are alkyl groups of 1 to 2 carbon atoms and $R_3$ is $-C_{n-1}H_{2n-1}$ in which $n$ is an integer from 1 to 3 and (2) carboxylic acid of the formula $R_4(COOH)_Z$ where $R_4$ is a hydrocarbon radical and Z is an integer from 1 to 2 in the presence of a dehydrated sulfonic acid cation exchange resin which possesses a macro-reticular structure, removing the cation exchange resin from the reaction mixture, and recovering the ester so formed.

4. A process for the preparation of esters in non-aqueous media which comprises reacting at a temperature of from about −20° C. to about 50° C. (1) an olefin containing four to eight carbon atoms of the structure

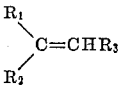

in which $R_1$ and $R_2$ are alkyl groups of 1 to 2 carbon atoms and $R_3$ is $-C_{n-1}H_{2n-1}$ in which $n$ is an integer from 1 to 3 and (2) carboxylic acid of the formula

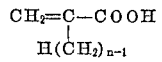

in which $n$ is an integer from 1 to 3 in the presence of a dehydrated sulfonic acid cation exchange resin which possesses a macro-reticular structure, removing the cation exchange resin from the reaction mixture, and recovering the ester so formed.

5. A process for the preparation of esters in non-aqueous media which comprises reacting at a temperature of from about −20° C. to about 50° C. (1) an olefin containing four to eight carbon atoms of the structure

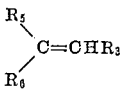

in which $R_5$ and $R_6$ taken collectively represent a fourto five-membered aliphatic chain and $R_3$ is $-C_{n-1}H_{2n-1}$ in which $n$ is an integer from 1 to 3 and (2) HCOOH in the presence of a dehydrated sulfonic acid cation exchange resin which possesses a macro-reticular structure, removing the cation exchange resin from the reaction mixture, and recovering the ester so formed.

6. A process for the preparation of esters in non-aqueous media which comprises reacting at a temperature of from about $-20°$ C. to about $50°$ C. (1) an olefin containing four to eight carbon atoms of the structure

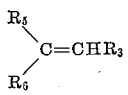

in which $R_5$ and $R_6$ taken collectively represent a four- to five-membered aliphatic chain and $R_3$ is $-C_{n-1}H_{2n-1}$ in which $n$ is an integer from 1 to 3 and (2) HOOC—COOH in the presence of a dehydrated sulfonic acid cation exchange resin which possesses a macro-reticular structure, removing the cation exchange resin from the reaction mixture, and recovering the ester so formed.

7. A process for the preparation of esters in non-aqueous media which comprises reacting at a temperature of from about $-20°$ C. to about $50°$ C. (1) an olefin containing four to eight carbon atoms of the structure

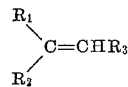

in which $R_5$ and $R_6$ taken collectively represent a four- to five-membered aliphatic chain and $R_3$ is $-C_{n-1}H_{2n-1}$ in which $n$ is an integer from 1 to 3 and (2) carboxylic acid of the formula $$R_4(COOH)_Z$$

where $R_4$ is a hydrocarbon radical and $Z$ is an integer from 1 to 2 in the presence of a dehydrated sulfonic acid cation exchange resin which possesses a macro-reticular structure, removing the cation exchange resin from the reaction mixture, and recovering the ester so formed.

8. A process for the preparation of esters in non-aqueous media which comprises reacting at a temperature of from about $-20°$ C. to about $50°$ C. (1) an olefin containing four to eight carbon atoms of the structure

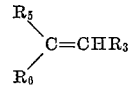

in which $R_5$ and $R_6$ taken collectively represent a four- to five-membered aliphatic chain and $R_3$ is $-C_{n-1}H_{2n-1}$ in which $n$ is an integer from 1 to 3 and (2) carboxylic acid of the formula

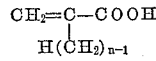

in which $n$ is an integer from 1 to 3 in the presence of a dehydrated sulfonic acid cation exchange resin which possesses a macro-reticular structure, removing the cation exchange resin from the reaction mixture, and recovering the ester so formed.

9. A process for the preparation of esters in non-aqueous media which comprises reacting at a temperature of from about $-20°$ C. to about $50°$ C. (1) an olefin containing four to eight carbon atoms of the structure

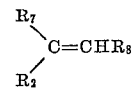

in which $R_7$ and $R_8$ taken collectively represent a three- to four-membered aliphatic chain and $R_2$ is an alkyl of 1 to 2 carbon atoms and (2) HCOOH in the presence of a dehydrated sulfonic acid cation exchange resin which possesses a macro-reticular structure, removing the cation exchange resin from the reaction mixture, and recovering the ester so formed.

10. A process for the preparation of esters in non-aqueous media which comprises reacting at a temperature of from about $-20°$ C. to about $50°$ C. (1) an olefin containing four to eight carbon atoms of the structure

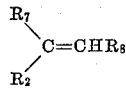

in which $R_7$ and $R_8$ taken collectively represent a three- to four-membered aliphatic chain and $R_2$ is an alkyl of 1 to 2 carbon atoms and (2) HOOC—COOH in the presence of a dehydrated sulfonic acid cation exchange resin which possesses a macro-reticular structure, removing the cation exchange resin from the reaction mixture, and recovering the ester so formed.

11. A process for the preparation of esters in non-aqueous media which comprises reacting at a temperature of from about $-20°$ C. to about $50°$ C. (1) an olefin containing four to eight carbon atoms of the structure

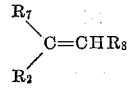

in which $R_7$ and $R_8$ taken collectively represent a three- to four-membered aliphatic chain and $R_2$ is an alkyl of 1 to 2 carbon atoms and (2) carboxylic acid of the formula $$R_4(COOH)_Z$$

where $R_4$ is a hydrocarbon radical and $Z$ is an integer from 1 to 2 in the presence of a dehydrated sulfonic acid cation exchange resin which possesses a macro-reticular structure, removing the cation exchange resin from the reaction mixture, and recovering the ester so formed.

12. A process for the preparation of esters in non-aqueous media which comprises reacting at a temperature of from about $-20°$ C. to about $50°$ C. (1) an olefin containing four to eight carbon atoms of the structure

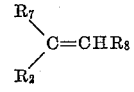

in which $R_7$ and $R_8$ taken collectively represent a three- to four-membered aliphatic chain and $R_2$ is an alkyl of 1 to 2 carbon atoms and (2) carboxylic acid of the formula

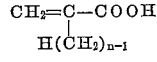

in which $n$ is an integer from 1 to 3 in the presence of a dehydrated sulfonic acid cation exchange resin which possesses a macro-reticular structure, removing the cation exchange resin from the reaction mixture, and recovering the ester so formed.

13. A process for the preparation of tertiary butyl acetate in non-aqueous media which comprises reacting at a temperature of from about $-20°$ C. to about $50°$ C. (1) isobutylene and (2) acetic acid in the presence of a dehydrated sulfonic acid cation exchange resin which possesses a macro-reticular structure, removing the cation exchange resin from the reaction mixture, and recovering the tertiary butyl acetate so formed.

14. A process for the preparation of tertiary butyl acrylate in non-aqueous media which comprises reacting at a temperature of from about $-20°$ C. to about $50°$ C. (1) isobutylene and (2) acrylic acid in the presence of a dehydrated sulfonic acid cation exchange resin which possesses a macro-reticular structure, removing the cation exchange resin from the reaction mixture, and recovering the tertiary butyl acrylate so formed.

15. A process for the preparation of tertiary butyl methacrylate in non-aqueous media which comprises reacting at a temperature of from about −20° C. to about 50° C. (1) isobutylene and (2) methacrylic acid in the presence of a dehydrated sulfonic acid cation exchange resin which possesses a macro-reticular structure, removing the cation exchange resin from the reaction mixture, and recovering the tertiary butyl methacrylate so formed.

16. A process for the preparation of tertiary butyl itaconate in non-aqueous media which comprises reacting at a temperature of from about −20° C. to about 50° C. (1) isobutylene and (2) itaconic acid in the presence of a dehydrated sulfonic acid cation exchange resin which possesses a macro-reticular structure, removing the cation exchange resin from the reaction mixture, and recovering the tertiary butyl itaconate so formed.

17. A process for the preparation of alkyl phenols in non-aqueous media which comprising reacting (1) an olefin and (2) a phenol in the presence of a dehydrated sulfonic acid type cation exchange resin which possesses a macro-reticular structure, removing the cation exchange resin from the reaction mixture, and recovering the alkyl phenol so formed.

18. A method for catalyzing reactions which are conducted in non-aqueous media and which are catalyzed by acids which comprises contacting a mixture of the reactants with the dehydrated acid form of a sulfonic acid cation exchange resin which possesses a macro-reticular structure.

19. A method for catalyzing reactions which are conducted in non-aqueous media and which are catalyzed by acids which comprises contacting a mixture of the reactants with the dehydrated acid form of a sulfonic acid cation exchange resin which possesses a macro-reticular structure, separating the cation exchange resin from the reaction mixture, and recovering the product so formed.

20. A process for the preparation of esters of carboxylic acids in non-aqueous media which comprises reacting an olefin having a carbon content of from 2 to 25 carbon atoms with a carboxylic acid in the presence of the acid form of a dehydrated sulfonic acid cation exchange resin which possesses a macro-reticular structure.

21. A process for the preparation of secondary esters in non-aqueous media which comprises reacting an olefin having a carbon atom content of from 3 to 25 carbon atoms with a carboxylic acid in the presence of the acid form of a dehydrated sulfonic acid cation exchange resin which possesses a macro-reticular structure, removing said cation exchange resin from the reaction mixture and recovering the ester so formed.

22. A process as set forth in claim 21 in which the olefin is an α-olefin.

23. A process for the preparation of primary esters in non-aqueous media which comprises reacting a carboxylic acid with ethylene in the presence of the acid form of a dehydrated sulfonic acid cation exchange resin which possesses a macro-reticular structure, removing said cation exchange resin from the reaction mixture and recovering the ester so formed.

24. A process for the polymerization of olefins in non-aqueous media which comprises reacting olefins and mixtures of olefins in the presence of the acid form of a dehydrated sulfonic acid type cation exchange resin which possesses a macro-reticular structure.

25. A process for the alkylation of aromatic hydrocarbons in non-aqueous media which comprises reacting an aromatic hydrocarbon with an olefin in the presence of the acid form of a dehydrated sulfonic acid type cation exchange resin which possesses a macro-reticular structure.

26. A process for the decomposition of cumene hydroperoxide in non-aqueous media to produce phenol and acetone which comprises heating cumene hydroperoxide in the presence of the acid form of a dehydrated sulfonic acid type cation exchange resin which possesses a macro-reticular structure.

References Cited in the file of this patent

UNITED STATES PATENTS

| | | |
|---|---|---|
| 2,018,065 | Ipatieff | Oct. 22, 1935 |
| 2,366,007 | D'Alelio | Dec. 26, 1944 |
| 2,415,000 | Bearse et al. | Jan. 28, 1947 |
| 2,500,149 | Boyer | Mar. 14, 1950 |
| 2,527,522 | Bond et al. | Oct. 31, 1950 |
| 2,534,304 | Serniuk et al. | Dec. 19, 1950 |
| 2,678,332 | Cottle | May 11, 1954 |
| 2,694,095 | Medcalf et al. | Nov. 9, 1954 |
| 2,761,877 | Mosnier | Sept. 4, 1956 |
| 2,789,143 | Arnold et al. | Apr. 16, 1957 |
| 2,836,627 | Neuworth et al. | May 27, 1958 |

OTHER REFERENCES

Bodamer et al.: "Industrial and Engineering Chemistry," vol. 43, pages 1082 to 1085, May 1951.

Calmon et al.: "Ion Exchangers in Organic and Biochemistry," 1957, pages 658–687.